United States Patent
Chang et al.

(10) Patent No.: US 12,315,887 B2
(45) Date of Patent: May 27, 2025

(54) METHOD AND DEVICE FOR CORRECTING POSITIONS OF TABS OF ELECTRODE ASSEMBLY

(71) Applicant: Contemporary Amperex Technology (Hong Kong) Limited, Hong Kong (CN)

(72) Inventors: Wen Chang, Ningde (CN); Jun Hu, Ningde (CN); Qiuhui Zheng, Ningde (CN); Yang Lei, Ningde (CN); Haoran Lu, Ningde (CN); Shiping Feng, Ningde (CN); Canbin Chen, Ningde (CN); Qing Wu, Ningde (CN); Dajun Ni, Ningde (CN); Pengfei Duan, Ningde (CN); Baiquan Zhao, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/820,332

(22) Filed: Aug. 30, 2024

(65) Prior Publication Data
US 2024/0421357 A1 Dec. 19, 2024

Related U.S. Application Data

(63) Continuation of application No. PCT/CN2022/086121, filed on Apr. 11, 2022.

(51) Int. Cl.
*H01M 10/0583* (2010.01)
*H01M 4/04* (2006.01)
*H01M 50/538* (2021.01)

(52) U.S. Cl.
CPC ......... *H01M 10/0583* (2013.01); *H01M 4/04* (2013.01); *H01M 50/538* (2021.01)

(58) Field of Classification Search
CPC ... H01M 10/0583; H01M 50/538; H01M 4/04
See application file for complete search history.

(56) References Cited

U.S. PATENT DOCUMENTS

| 11,276,876 B2 | 3/2022 | Kwak et al. |
| 2022/0021016 A1 | 1/2022 | Zhao et al. |
| 2022/0266466 A1* | 8/2022 | Mai ................... H01M 10/0404 |

FOREIGN PATENT DOCUMENTS

| CN | 102646804 A | 8/2012 |
| CN | 105977506 A * | 9/2016 ........ H01M 10/0587 |

(Continued)

OTHER PUBLICATIONS

WO 2020197266 English Translation (Year: 2020).*

(Continued)

*Primary Examiner* — Jimmy Vo
(74) *Attorney, Agent, or Firm* — K&L Gates LLP

(57) ABSTRACT

Provided are a method and device for correcting positions of tabs of an electrode assembly. The electrode assembly includes anode electrode plates and cathode electrode plates stacked alternately in a first direction. The method includes: determining whether there are a plurality of consecutive tabs misaligned with each other in a first electrode plate assembly; and adjusting, if there are a plurality of consecutive tabs misaligned with each other, a cutting position of the first electrode plate assembly to adjust a width of first electrode plates obtained after cutting, such that tabs of a plurality of first electrode plates obtained after cutting the first electrode plate assembly are aligned with each other, the first electrode plates being anode electrode plates or cathode electrode plates.

14 Claims, 5 Drawing Sheets

(56) References Cited

FOREIGN PATENT DOCUMENTS

| CN | 109301147 | A | 2/2019 |
| CN | 109301352 | A | 2/2019 |
| CN | 211320211 | U | 8/2020 |
| CN | 213752755 | U | 7/2021 |
| CN | 213852955 | U | 8/2021 |
| CN | 214957025 | U | 11/2021 |
| CN | 113782819 | A | 12/2021 |
| EP | 3866254 | A1 | 8/2021 |
| JP | 2002110148 | A | 4/2002 |
| JP | 2016001624 | A | 1/2016 |
| JP | 2020027721 | A | 2/2020 |
| JP | 2021051924 | A | 4/2021 |
| KR | 1020200058956 | A | 5/2020 |
| KR | 1020200114408 | A | 10/2020 |
| KR | 1020210058170 | A | 5/2021 |
| KR | 102322793 | B1 | 11/2021 |
| WO | WO-2020197266 | A1 * | 10/2020 ........... B26D 1/1435 |
| WO | 2022055317 | A1 | 3/2022 |

OTHER PUBLICATIONS

CN 105977506 English Translation (Year: 2016).*
International Search Report received in the corresponding international application PCT/CN2022/086121, mailed on Oct. 26, 2022.
Written Opinion of ISA received in the corresponding international application PCT/CN2022/086121, mailed on Oct. 26, 2022.
The extended European search report received in the corresponding European application 22936768.5, mailed on Oct. 8, 2024.
Notice of Reasons for Refusal received in the corresponding Japanese application 2024-513225, mailed on Oct. 8, 2024.
The Grant Decision received in the counterpart Japanese application 2024-513225, mailed on Apr. 1, 2025.
The Notice of Allowance received in the counterpart Korean application 10-2024-7006703, mailed on Feb. 17, 2025.

* cited by examiner

METHOD AND DEVICE FOR CORRECTING POSITIONS OF TABS OF ELECTRODE ASSEMBLY

CROSS-REFERENCE TO RELATED APPLICATION

The present application is a continuation of International Application No. PCT/CN2022/086121, filed Apr. 11, 2022, entitled "METHOD AND DEVICE FOR CORRECTING POSITIONS OF TABS OF ELECTRODE ASSEMBLY", which is incorporated herein by reference in its entirety.

TECHNICAL FIELD

The present application relates to the technical field of batteries, and particularly to a method and device for correcting positions of tabs of an electrode assembly.

BACKGROUND ART

The use of batteries to save energy and reduce emissions is the key to the sustainable development of automotive industry, electric vehicles have become an important part of the sustainable development of automotive industry due to their advantages of energy saving and environmental protection. For electric vehicles, battery technology is an important factor related to their development.

In general, a battery is composed of a plurality of battery cells, each battery cell including an electrode assembly. The electrode assembly is composed of an anode electrode plate and a cathode electrode plate, and electric energy is generated by the movement of metal ions between the cathode electrode plate and the anode electrode plate. An end face of the electrode plate along its width direction is provided with a tab in a protruding manner. The manufacturing of the tabs is related to the quality and safety of the battery. If there is a problem of misalignment of the tab, the manufactured battery cell will be unqualified.

SUMMARY OF THE INVENTION

Embodiments of the present application provide a method and device for correcting positions of tabs of an electrode assembly, which can effectively correct the positions of the tabs and improve the performance and the manufacturing efficiency of the electrode assembly.

In a first aspect, provided is a method for correcting positions of tabs of an electrode assembly. The electrode assembly includes anode electrode plates and cathode electrode plates stacked alternately in a first direction. The method includes: determining whether there are a plurality of consecutive tabs misaligned with each other in a first electrode plate assembly; and adjusting, if there are a plurality of consecutive tabs misaligned with each other, a cutting position of the first electrode plate assembly to adjust a width of first electrode plates obtained after cutting, such that tabs of a plurality of first electrode plates obtained after cutting the first electrode plate assembly are aligned with each other, the first electrode plates being anode electrode plates or cathode electrode plates.

Therefore, according to the method for correcting positions of tabs of an electrode assembly according to the embodiments of the present application, a plurality of first electrode plates with different widths can be obtained by adjusting the positions where the first electrode plates are cut if a plurality of consecutive tabs are subjected to misaligned lagging or leading; and the stacking positions of the plurality of first electrode plates can also be adjusted, and the relative positions of the tabs are then adjusted, so that the originally misaligned lagging or leading tabs can be adjusted into a substantially aligned state, avoiding the problem of unqualified manufacturing of electrode assemblies caused by tab misalignment, and therefore avoiding the problem of unqualified manufacturing of battery cells, thereby improving the manufacturing efficiency and product quality of battery cells.

In some embodiments, adjusting, if there are a plurality of consecutive tabs misaligned with each other, a cutting position of the first electrode plate assembly includes: delaying, if each of the plurality of consecutive tabs is subjected to misaligned lagging and the number of tabs of the plurality of consecutive tabs is greater than or equal to a first threshold, the cutting position of the first electrode plate assembly to increase the width of the first electrode plates obtained after cutting, such that the tabs of the plurality of first electrode plates are aligned with each other; and/or advancing, if each of the plurality of consecutive tabs is subjected to misaligned leading and the number of tabs of the plurality of consecutive tabs is greater than or equal to a second threshold, the cutting position of the first electrode plate assembly to reduce the width of the first electrode plates obtained after cutting, such that the tabs of the plurality of first electrode plates are aligned with each other.

By setting the first threshold and the second threshold, it is possible to avoid that, when an individual tab is subjected to misaligned lagging or leading, or when an individual tab is wrinkled, it is wrongly determined that the position of the tab needs to be adjusted, thereby improving the accuracy of correction.

In some embodiments, a distance by which the cutting position of the first electrode plate assembly is delayed is a first preset distance, which is less than or equal to five thousandths of a preset standard width of the first electrode plate; and/or a distance by which the cutting position of the first electrode plate assembly is advanced is a second preset distance, which is less than or equal to five thousandths of the preset standard width of the first electrode plate.

In this way, it is possible to avoid that the excessive magnitude of misalignment adjustment caused by the too large delay distance leads to the adjustment from an original misaligned lagging state into a misaligned leading state, or that the excessive magnitude of misalignment adjustment caused by the too large advance distance leads to the adjustment from an original misaligned leading state into a misaligned lagging state, which will still lead to the unqualified manufacturing of the electrode assembly. In addition, it is also possible to avoid the excessive width of the cut first electrode plate caused by too large delay distance, and the too large width of the first electrode plate may cause lithium plating during the use of the battery cell; or it is also possible to avoid the too small width of the first electrode plate caused by the too large advance distance, which will seriously affect the capacity of the battery cell formed by the electrode assembly.

In some embodiments, adjusting, if there are a plurality of consecutive tabs misaligned with each other, a cutting position of the first electrode plate assembly includes: stopping, if each of the plurality of consecutive tabs is subjected to misaligned lagging and the number of tabs of the plurality of consecutive tabs is greater than or equal to a third threshold, the operation of advancing the cutting position of the first electrode plate assembly, the third threshold being less than or equal to the first threshold; and/or stopping, if each of the plurality of consecutive tabs is subjected to misaligned leading and the number of tabs of the plurality of consecutive tabs is greater than or equal to a fourth threshold, the operation of delaying the cutting position of the first electrode plate assembly, the fourth threshold being less than or equal to the second threshold. In this way, it is possible to avoid, in a timely manner, that the continuation of the original cutting advancing operation or cutting delaying operation would cause the tab misalignment instead.

In some embodiments, the first threshold is equal to the second threshold.

In some embodiments, determining whether there are a plurality of consecutive tabs misaligned with each other in a first electrode plate assembly includes: determining, according to a difference between i-th position data of an i-th tab in the first electrode plate assembly and preset position data, whether the i-th tab is subjected to misaligned lagging or leading, the i-th position data indicating a relative positional relationship between the i-th tab and a preset reference object, where i is a positive integer; and determining, if it is determined that each of the i-th tab to an (i+j)-th tab is subjected to misaligned lagging or leading, that there are the plurality of consecutive tabs misaligned with each other in the first electrode plate assembly, wherein the plurality of consecutive tabs are the i-th tab to the (i+j)-th tab.

Whether there are a plurality of consecutive tabs misaligned with each other is determined by determining whether each of the i-th tab to the (i+j)-th tab is subjected to misaligned lagging or leading, so that it is possible to adjust, in a timely manner, the position where the first electrode plate assembly is cut when there are a plurality of consecutive tabs misaligned with each other, and then adjust the positions of the tabs.

In some embodiments, determining, according to a difference between i-th position data of an i-th tab in the first electrode plate assembly and preset position data, whether the i-th tab is subjected to misaligned lagging or leading includes: determining, if the difference between the i-th position data and the preset position data is greater than or equal to a fifth threshold, that the i-th tab is subjected to misaligned lagging, the fifth threshold being greater than zero; and determining, if the difference between the i-th position data and the preset position data is less than or equal to a sixth threshold, that the i-th tab is subjected to misaligned leading, the sixth threshold being less than zero.

In some embodiments, the method further includes: determining the i-th position data.

In some embodiments, determining the i-th position data includes: determining a moment when the i-th tab is detected as a target moment; and determining that at the target moment, a positional relationship between the position of the i-th tab and the preset reference object is the i-th position data.

From a tab detection sensor sensing a tab and sending a sensing signal to a processing unit to the processing unit receiving the signal, there may be a time difference required for signal transmission. The time difference will cause the processing unit to determine the inaccurate i-th position data of the i-th tab. Therefore, by adding a timestamp to the sensing signal sent when the tab detection sensor senses the tab, it is possible to record a target moment when the tab is detected, and to determine the i-th position data according to the target moment, so as to reduce or avoid calculation errors.

In some embodiments, the first electrode plates are cathode electrode plates, and the electrode assembly includes the plurality of first electrode plates.

In some embodiments, an upper surface and a lower surface of the anode electrode plate are alternately provided with a plurality of indentations, an anode electrode plate area is between two adjacent indentations of the plurality of indentations, and the anode electrode plate is configured to be bent at the indentations, such that a plurality of anode electrode plate areas and the plurality of cathode electrode plates are alternately stacked in the first direction.

In some embodiments, the method further includes: covering the upper surface and the lower surface of the anode electrode plate having the indentations respectively with a first separator and a second separator; and arranging, according to the positions of the indentations of the anode electrode plate, the plurality of cut first electrode plates sequentially on an upper surface of the first separator and a lower surface of the second separator, such that each of the plurality of anode electrode plate areas is correspondingly provided with one first electrode plate, the anode electrode plate is configured to be bent at the indentations such that the plurality of anode electrode plate areas and the plurality of first electrode plates are alternately stacked in the first direction, and the first separator and the second separator are configured to isolate each anode electrode plate area from the corresponding first electrode plate. Since the anode electrode plates are provided with indentations, in the process of free-falling and stacking, the indentations are repeatedly bent in different directions, so that the plurality of anode electrode plate areas and the plurality of first electrode plates can be alternately stacked in the first direction, thereby forming the electrode assembly.

In some embodiments, the preset reference object is: the anode electrode plate area corresponding to the first electrode plate where the i-th tab is located; or the indentation corresponding to the first electrode plate where the i-th tab is located.

In a second aspect, provided is a device for correcting positions of tabs of an electrode assembly, the device being configured to implement the method in the first aspect as described above. Specifically, the device includes a unit for implementing the method of the first aspect as described above.

In a third aspect, provided is a device for correcting positions of tabs of an electrode assembly, the device including a processor and a memory. The memory is configured to store a computer program, and the processor is configured to call and run the computer program stored in the memory to implement the method in the first aspect as described above.

In a fourth aspect, provided is a computer readable storage medium for storing a computer program, wherein the computer program causes a computer to implement the method in the first aspect as described above.

In a fifth aspect, provided is a computer program product, including computer program instructions, wherein the computer program instructions enable a computer to implement the method in the first aspect as described above.

In a sixth aspect, provided is a computer program, which, when running on a computer, causes the computer to implement the method in the first aspect as described above.

In a seventh aspect, provided is a stacking machine, configured to manufacture an electrode assembly, the electrode assembly including anode electrode plates and cathode electrode plates stacked alternately in a first direction, the stacking machine including: the device for correcting positions of tabs of an electrode assembly in the second aspect as described above.

Figures 1, 2:
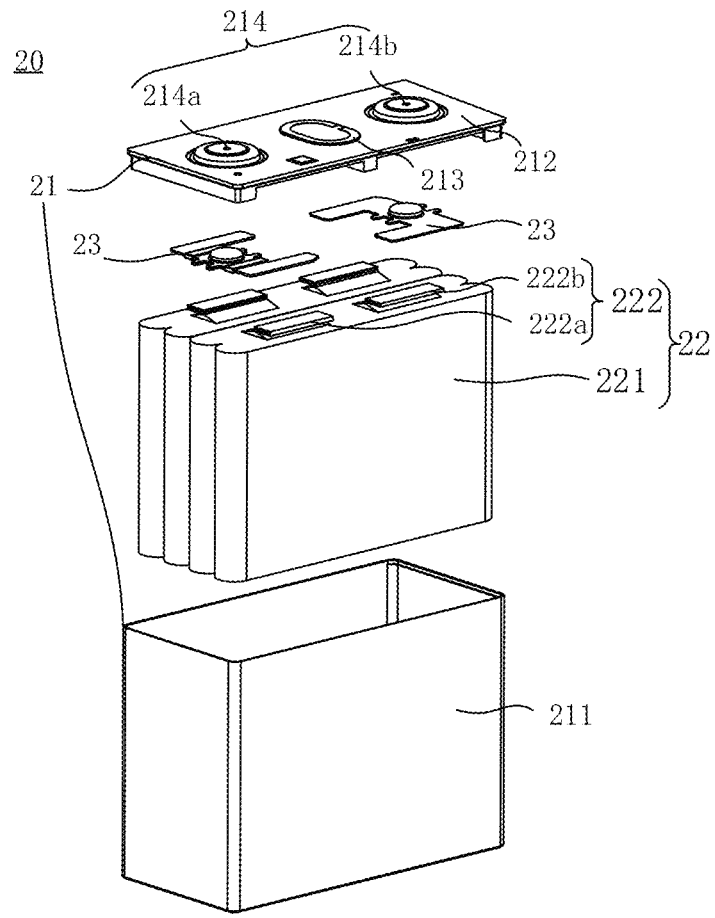
FIG. 1 is a schematic flowchart of a method for correcting positions of tabs of an electrode assembly disclosed in an embodiment of the present application.
FIG. 2 is an exploded schematic structural diagram of a battery cell disclosed in an embodiment of the present application.

In the accompanying drawings, the figures are not necessarily drawn to scale.

DETAILED DESCRIPTION

Implementations of the present application are described in further detail below in conjunction with the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are used for descriptive purposes only, and cannot be construed as indicating or implying relative importance. "Perpendicular" is not strictly perpendicular, but within the allowable range of errors. "Parallel" is not strictly parallel, but within the allowable range of error.

Orientation words appearing in the following description are all directions shown in the drawings, and do not limit the specific structure of the present application. In the description of the present application, it should also be noted that, unless otherwise expressly specified and limited, the terms "mount", "connected", and "connecting" should be broadly understood, for example, they may be a fixed connection or a detachable connection or be an integrated connection; or may be a direct connection or an indirect connection through an intermediate medium. For those of ordinary skill in the art, the specific meanings of the above terms in the present application may be understood according to specific circumstances.

In the embodiments of the present application, the same reference signs denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

Reference in the present application to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

A battery mentioned in the present application refers to a single physical module that includes one or more battery cells to provide higher voltage and capacity. For example, the battery mentioned in the present application may include a battery module, a battery pack, or the like. The battery generally includes a box body for packaging one or more battery cells. The box body can prevent liquids or other foreign matters from affecting charging or discharging of the battery cells.

In some embodiments, the battery cell may include a lithium-ion secondary battery, a lithium-ion primary battery, a lithium-sulfur battery, a sodium/lithium-ion battery, a sodium-ion battery or a magnesium-ion battery and so on, which will not be limited in the embodiments of the present application. Generally, a battery cell may also be called a cell. The battery cell may be cylindrical, flat, rectangular, or in other regular or irregular shapes. The technical solutions according to the embodiments of the present application may be applied to battery cells in any shape.

The battery cell includes an electrode assembly and an electrolyte solution, the electrode assembly being composed of a cathode plate, an anode plate and a separator. The operation of the battery cell mainly relies on the movement of metal ions between the cathode plate and the anode plate. The cathode plate includes a cathode current collector and a cathode active material layer. The cathode active material layer is coated on a surface of the cathode current collector, and the current collector that is not coated with the cathode active material layer protrudes from the current collector that has been coated with the cathode active material layer and is used as a cathode tab. Taking a lithium-ion battery as an example, the cathode current collector may be made of aluminum, and the cathode active material may be lithium cobalt oxide, lithium iron phosphate, ternary lithium or lithium manganate, etc. The anode plate includes an anode current collector and an anode active material layer. The anode active material layer is coated on a surface of the anode current collector, and the current collector that is not coated with the anode active material layer protrudes from the current collector that has been coated with the anode active material layer and is used as an anode tab. The anode current collector may be made of copper, and the anode active material may be carbon, silicon, etc. In order to ensure that no fusing occurs when a large current passes, there are a plurality of cathode tabs which are stacked together, and there are a plurality of anode tabs which are stacked together. The separator may be made of polypropylene (PP) or polyethylene (PE).

With the development of the battery technology, it is necessary to consider many design factors, such as energy density, cycle life, discharge capacity, C-rate and other performance parameters. In addition, the manufacturing efficiency of the battery also needs to be considered. The manufacturing of the tabs is directly related to the quality and safety of the battery cell, and is therefore related to the performance and safety of the battery. For example, for a stacked electrode assembly, during a production process, tabs of cathode electrode plates or tabs of anode electrode plates are prone to tab misalignment due to factors such as die-cutting size differences and the slippage of an electrode plate driving mechanism, which will lead to unqualified manufacturing of the battery cell. It is necessary to avoid the misalignment of the tabs or adjust the misaligned tabs in a timely manner to ensure the qualified rate of battery cells.

Therefore, the embodiments of the present application provide a method and device for correcting positions of tabs of an electrode assembly, which are suitable for correcting tabs of a stacked electrode assembly. In this method, if there are a plurality of consecutive tabs misaligned with each other in a first electrode plate assembly, a cutting position of the first electrode plate assembly is adjusted, to adjust a width of first electrode plates obtained after cutting, such that tabs of a plurality of first electrode plates obtained after cutting the first electrode plate assembly are aligned with each other. In this way, in the case of misalignment of the tabs, for example, in the case of misaligned lagging or leading, a plurality of first electrode plates with different widths can be obtained by adjusting the positions where the first electrode plates are cut; and the stacking positions of the plurality of first electrode plates can also be adjusted, and the relative positions of the tabs are then adjusted, so that the originally misaligned lagging or leading tabs can be adjusted into a substantially aligned state, avoiding the problem of unqualified manufacturing of electrode assemblies caused by tab misalignment, and therefore avoiding the problem of unqualified manufacturing of battery cells, thereby improving the manufacturing efficiency and product quality of battery cells.

FIG. 1 shows a schematic flowchart of a method 100 for correcting positions of tabs of an electrode assembly according to an embodiment of the present application. The method 100 may be used in the process of correcting tabs of an electrode assembly. The electrode assembly includes anode electrode plates and cathode electrode plates stacked alternately in a first direction. As shown in FIG. 1, the method 100 includes: a step S110 of determining whether there are a plurality of consecutive tabs misaligned with each other in a first electrode plate assembly; and a step S120 of adjusting, if there are a plurality of consecutive tabs misaligned with each other, a cutting position of the first electrode plate assembly to adjust a width of first electrode plates obtained after cutting, such that tabs of a plurality of first electrode plates obtained after cutting the first electrode plate assembly are aligned with each other, the first electrode plates being anode electrode plates or cathode electrode plates.

It should be understood that the first electrode plate assembly in the embodiment of the present application may be cut into a plurality of first electrode plates, and the first electrode plates may be anode electrode plates or cathode electrode plates for stacking to form an electrode assembly.

According to the method 100 for correcting positions of tabs of an electrode assembly according to the embodiment of the present application, a plurality of first electrode plates with different widths can be obtained by adjusting the positions where the first electrode plates are cut in the case of misalignment of a plurality of consecutive tabs, for example, in the case of misaligned lagging or leading; and the stacking positions of the plurality of first electrode plates can also be adjusted, and the relative positions of the tabs are then adjusted, so that the originally misaligned lagging or leading tabs can be adjusted into a substantially aligned state, avoiding the problem of unqualified manufacturing of electrode assemblies caused by tab misalignment, and therefore avoiding the problem of unqualified manufacturing of battery cells, thereby improving the manufacturing efficiency and product quality of battery cells.

It should be understood that the method 100 according to the embodiment of the present application may be used in the process of correcting the tabs of the electrode assembly arranged in a battery cell. FIG. 2 shows an exploded schematic structural diagram of a battery cell according to an embodiment of the present application; As shown in FIG. 2, the battery cell may include one or more electrode assemblies 22 and a shell 21 for accommodating the electrode assemblies 22.

It should be understood that, as shown in FIG. 2, the shell 21 in the embodiment of the present application may be of a polyhedron structure. Specifically, the shell 21 may include a shell body 211 and a cover plate 212. The shell body 211 may be a hollow structure with an opening formed at at least one end, and the shape of the cover plate 212 may be adapted to the shape of the shell body 211. The cover plate 212 is configured to cover the opening of the shell body 211 such that the shell 21 isolates the internal environment of the battery cell 20 from the external environment. If the shell body 211 is a hollow structure with an opening formed at one end, one cover plate 212 may be provided, such as indicated in FIG. 2. In contrast, if the shell body 211 is a hollow structure with openings formed at two opposite ends, two cover plates 212 may be provided, and the two cover plates 212 respectively cover the openings at the two ends of the shell body 211.

The shell body 211 in the embodiment of the present application may be made of various materials, such as copper, iron, aluminum, steel, and aluminum alloy. The cover plate 212 may also be made of various materials, such as copper, iron, aluminum, steel, and aluminum alloy. The material of the cover plate 212 and the material of the shell body 211 may be the same or different.

The shell 21 in the embodiment of the present application may be in various shapes, such as a cylinder or a cuboid. The shapes of the shell body 211 and the cover plate 212 match each other. For example, as shown in FIG. 2, the shell body 211 may be a cuboid structure, and the cover plate 212 is a rectangular plate-shaped structure adapted to the shell body 211.

For ease of description, an example is taken in which the shell 21 is a cuboid in the present application. Specifically, as shown in FIG. 2, the shell 21 includes: a shell body 211, which shell body 211 is a hollow structure with an opening at one end; and a cover plate 212, which cover plate 212 is configured to cover the opening of the shell body 211 to form a closed cavity for having an electrode assembly 22 placed therein.

Optionally, the shell 21 in the embodiment of the present application may be provided with a plurality of components. For example, as shown in FIG. 2, the battery cell 20 may further include a pressure relief mechanism 213. The pressure relief mechanism 213 may be arranged at any wall of the shell 21. For example, in FIG. 2, an example is taken in which the pressure relief mechanism 213 is located on the cover plate 212. Specifically, the pressure relief mechanism 213 is configured, when an internal pressure or temperature of the battery cell 20 reaches a threshold, to be actuated to release the internal pressure or heat.

For the battery 10, the main safety hazard comes from the charging and discharging processes. In order to improve the safety performance of the battery 10, a pressure relief mechanism 213 is generally provided for the battery cell 20. The pressure relief mechanism 213 refers to an element or component that is actuated when an internal pressure or temperature of the battery cell 20 reaches a predetermined threshold so as to release the internal pressure or heat. The predetermined threshold may be adjusted according to different design requirements. The predetermined threshold may depend on the material of one or more of the cathode electrode plate, the anode electrode plate, the electrolyte solution, and the separator in battery cell 20. The pressure relief mechanism 213 may be realized by means of an indentation on the cover plate 212, or may use an element or component that is sensitive to pressure or temperature. That is, when the internal pressure or temperature of the battery cell 20 reaches a predetermined threshold, the pressure relief mechanism 213 is actuated, thereby creating a channel through which the internal pressure or heat can be released.

By "actuate" mentioned in the present application means that the pressure relief mechanism 213 generates an action such that the internal pressure and heat can be released from the battery cell 20. The action generated by the pressure relief mechanism 213 may include, but not limited to, at least a part of the pressure relief mechanism 213 being broken, torn or melted. After the pressure relief mechanism 213 is actuated, high-temperature and high-pressure substances inside the battery cell 20 are discharged outwardly from the pressure relief mechanism 213 as emissions. In this way, the pressure and heat in the battery cell 20 can be released at a controllable pressure or temperature, thereby avoiding potential, more serious accidents.

The emissions from the battery cell 20 mentioned in the present application include, but not limited to: the electrolytic solution, the dissolved or split cathode or anode electrode plates, fragments of the separator, high-temperature and high-pressure gas generated by reaction, flame, etc.

The pressure relief mechanism 213 on the battery cell 20 has an important impact on the safety of the battery. For example, when short circuit, overcharge and other phenomena occur on the battery cell 20, it is possible to lead to thermal runaway inside the battery cell 20, resulting in a sudden increase in pressure or temperature. In this case, the internal pressure and heat can be released outwardly through the actuation of the pressure relief mechanism 213, to prevent the battery cell 20 from exploding and catching fire.

In the battery cell 20, the inside of the shell body 211 is configured to accommodate the electrode assembly 22, and, according to actual usage requirements, one or more electrode assemblies 22 may be provided in the shell body 211. For example, FIG. 2 illustrates that the battery cell 20 includes four electrode assemblies 22 arranged in the first direction X, but the embodiments of the present application are not limited thereto.

In the embodiments of the present application, the electrode assembly 22 is a component of a battery cell 20 where an electrochemical reaction occurs. The electrode assembly 22 may be a cylinder, a cuboid, etc. If the electrode assembly 22 is a cylindrical structure, the shell body 211 may also be a cylindrical structure, and if the electrode assembly 22 is a cuboid structure, the shell body 211 may also be a cuboid structure.

For any electrode assembly 22, the electrode assembly 22 may include tabs 222 and a main body 221. Specifically, as shown in FIG. 2, the electrode assembly 22 may include at least two tabs 222. The two tabs 222 may include a cathode tab 222a and an anode tab 222b. The cathode tab 222a may be formed by stacking parts of the cathode electrode plate that are not coated with a cathode active material layer, and the anode tab 222b may be formed by stacking parts of the anode electrode plate that are not coated with a anode active material layer.

Electrode terminals 214 are further provided on the shell 21 in the embodiments of the present application, and the electrode terminals 214 are configured to be electrically connected to the electrode assembly 22 to output electric energy of the battery cell 20. For example, as shown in FIG. 2, the battery cell 20 may further include at least two electrode terminals 214. The two electrode terminals 214 may be arranged on the cover plate 212. The cover plate 212 is generally in the shape of a flat plate, and the two electrode terminals 214 are fixed on a flat plate surface of the cover plate 212. The two electrode terminals 214 are a cathode electrode terminal 214a and a negative electrode terminal 214b, respectively. Each electrode terminal 214 is correspondingly provided with a connecting member 23. The connecting member 23 is located between the cover plate 212 and the electrode assembly 22 and is configured to electrically connect the electrode assembly 22 to the electrode terminal 214. Specifically, as shown in FIG. 2, the cathode tab 222a of the electrode assembly 22 may be connected to the cathode electrode terminal 214a via a connecting member 23, and the anode tab 222b of the electrode assembly 22 may be connected to the negative electrode terminal 214b via another connecting member 23.

It should be understood that the main body 221 of the electrode assembly 22 in the embodiments of the present application may be formed by stacking the part of the cathode electrode plate coated with the cathode active material layer and the part of the anode electrode plate coated with the anode active material layer. For this stacked electrode assembly 22, the electrode plates may be stacked in various ways.

Figure 3:
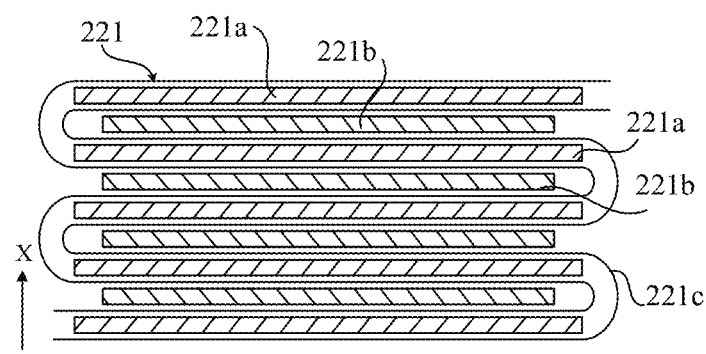
FIG. 3 is a schematic cross-sectional diagram of an electrode assembly disclosed in an embodiment of the present application.

Optionally, as an embodiment, FIG. 3 shows a possible schematic cross-sectional view of an electrode assembly 22 according to an embodiment of the present application, with the cross-section being parallel to the first direction X. As shown in FIG. 3, the main body of the electrode assembly 22 includes a plurality of first electrode plates 221b and a plurality of second electrode plates 221a, and the plurality of first electrode plates 221b and the plurality of second electrode plates 221a are alternately stacked in the first direction X.

As shown in FIG. 3, the electrode assembly 22 further includes a spacer 221c between the electrode plates, and the spacer 221c is configured to insulate and isolate the first electrode plate 221b and the second electrode plate 221a adjacent to each other.

Figure 4:
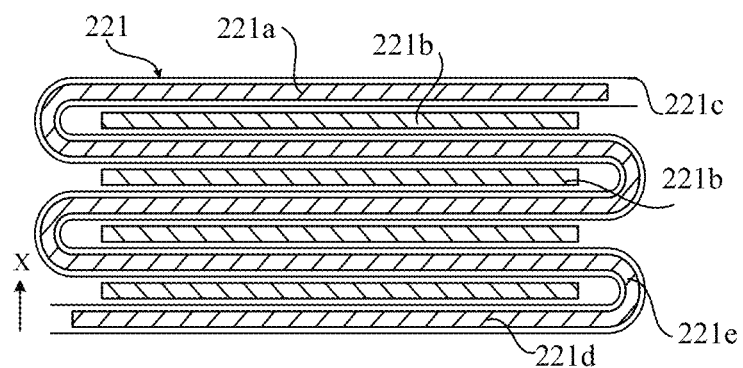
FIG. 4 is a schematic cross-sectional diagram of an electrode assembly disclosed in another embodiment of the present application.

In some embodiments, the stacking of the stacked electrode assembly 22 may also be carried out in other ways. Specifically, FIG. 4 shows another possible schematic cross-sectional view of an electrode assembly 22 according to an embodiment of the present application, with the cross-section being parallel to the first direction X. As shown in FIG. 4, the electrode assembly 22 includes a second electrode plate 221a and a plurality of first electrode plates 221b. The second electrode plate 221a includes a plurality of stacking sections 221d and a plurality of bent sections 221e. The bent section 221e is configured to connect the two adjacent stacking sections 221d, and the plurality of first electrode plates 221b and the plurality of stacking sections 221d are alternately stacked in the first direction X.

As shown in FIG. 4, the electrode assembly 22 further includes spacers 221c between the plurality of electrode plates, and the spacers 221c are configured to insulate and isolate the second electrode plate 221a from the first electrode plates 221b.

It should be understood that the second electrode plate 221a and the first electrode plate 221b in FIGS. 3 and 4 are two electrode plates with opposite polarities. For example, if the first electrode plate 221b is a cathode electrode plate, then the second electrode plate 221a is an anode electrode plate; and if the first electrode plate 221b is an anode electrode plate, then the second electrode plate 221a is a cathode electrode plate. A solution is shown in FIGS. 3 and 4 in which the second electrode plate 221a is an anode electrode plate, and the first electrode plate 221b is a cathode electrode plate. In this way, the anode electrode plate can cover the cathode electrode plate to avoid lithium plating.

It should be understood that the method 100 according to the embodiments of the present application may be used for any of the electrode assemblies 22 as described above. For the convenience of description, the electrode assembly 22 as shown in FIG. 4 is mainly taken as an example below for description, that is, the correction of the tab corresponding to the cathode electrode plate 221b shown in FIG. 4 is taken as an example, but the embodiments of the present application are not limited thereto. For example, the method 100 may also be used for correcting the tabs of the first electrode plate 221b and/or the second electrode plate 221a shown in FIG. 3. For the sake of brevity, details are not repeated here.

Figure 5:
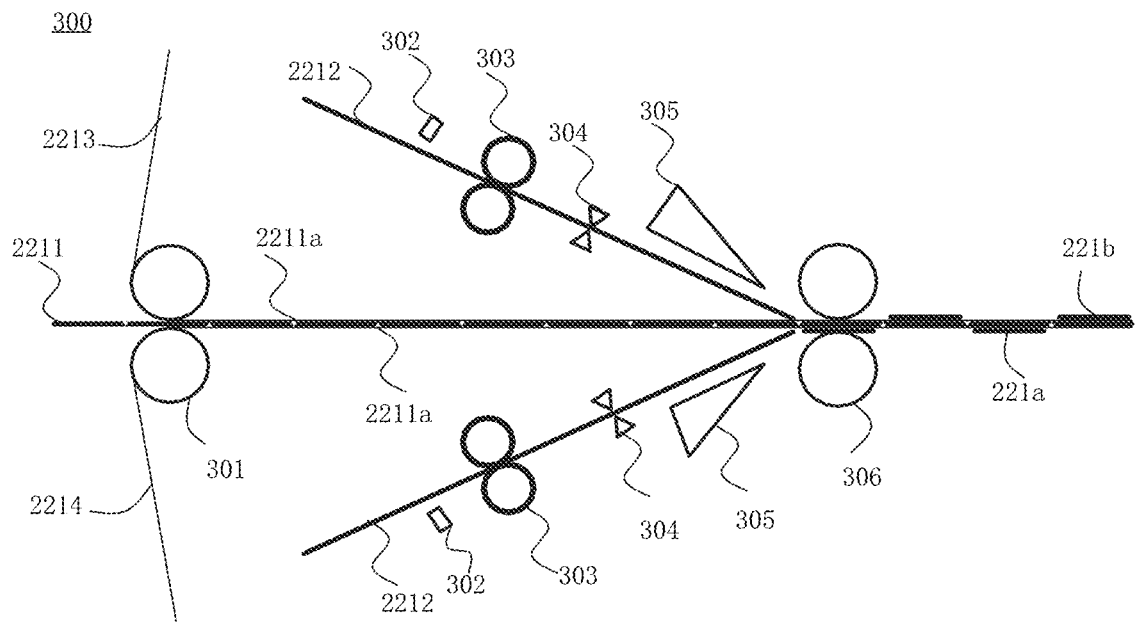
FIG. 5 is a schematic diagram of a device for manufacturing an electrode assembly disclosed in an embodiment of the present application.
Figure 6:
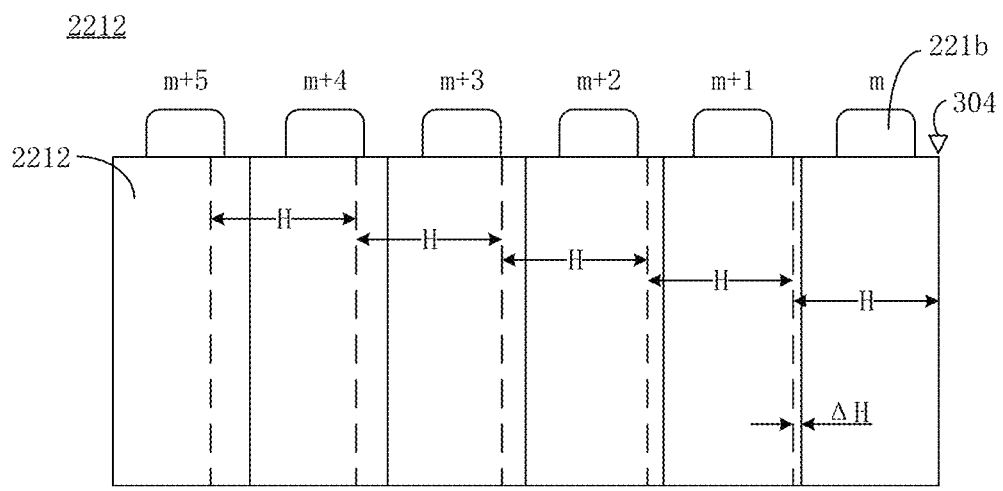
FIG. 6 is a schematic diagram of an adjustment of a cutting position of a first electrode plate assembly disclosed in an embodiment of the present application.

FIG. 5 shows a schematic diagram of a device 300 for manufacturing an electrode assembly 22 according to an embodiment of the present application. The device 300 may be used for manufacturing an electrode assembly 22. For example, the device 300 may be a stacking machine. FIG. 6 shows a schematic diagram of an adjustment of a cutting position of a first electrode plate assembly 2212 according to an embodiment of the present application, and FIG. 6 only shows a part of the first electrode plate assembly 2212. The process of manufacturing an electrode assembly 22 according to the embodiments of the present application will be described in detail below with reference to FIGS. 4 to 6.

As shown in FIGS. 4 and 5, an example is taken in which the first electrode plate assembly 2212 here is used for obtaining cathode electrode plates 221b by cutting, that is, the first electrode plates 221b are cathode electrode plates, and the electrode assembly 22 includes a plurality of first electrode plates 221b.

Correspondingly, the anode electrode plate 2211 is configured to be alternately stacked with the cut first electrode plates to form the electrode assembly 22. Specifically, as shown in FIGS. 4 and 5, an upper surface and a lower surface of the anode electrode plate 2211 are alternately provided with a plurality of indentations 2211a and 2211b, an anode electrode plate area is between two adjacent indentations of the plurality of indentations 2211a and 2211b, and the anode electrode plate 2211 is configured to be bent at the indentations 2211a and 2211b, such that a plurality of anode electrode plate areas and the plurality of cathode electrode plates 221b are alternately stacked in the first direction X.

As shown in FIGS. 4 and 5, the upper surface and the lower surface of the anode electrode plate 2211 are alternately provided with a plurality of indentations 2211a and 2211b. The indentations 2211a on the upper surface may be configured to bend the anode electrode plate 2211 downwardly, and the indentations 2211b on the lower surface may be configured to bend the anode electrode plate 2211 upwardly. Specifically, in the electrode assembly 22 formed after bending, each bent section 221e of the anode electrode plate 221a in FIG. 4 includes the indentation 2211a or 2211b of the anode electrode plate 2211 in FIG. 5, and at least a part of the anode electrode plate area between the two adjacent indentations 2211a and 2211b in FIG. 5 is configured to form the stacking section 221d of the anode electrode plate 221a in FIG. 4.

It should be understood that the distance between the plurality of indentations 2211a and 2211b alternately provided on the upper and lower surfaces of the anode electrode plate 2211 in the embodiments of the present application may be set according to actual applications, for example, it may be set according to the required capacity of the battery cell. The embodiments of the present application are not limited thereto. In addition, the plurality of indentations 2211a and 2211b alternately provided on the upper and lower surfaces of the anode electrode plate 2211 are evenly distributed to ensure that the plurality of obtained anode electrode plate areas, in other words, the plurality of stacking sections 221d are of equal size, thereby ensuring the quality of the electrode assembly.

Optionally, as shown in FIGS. 4 and 5, the method for manufacturing an electrode assembly according to the embodiments of the present application or the method 100 according to the embodiments of the present application may further include: covering the upper surface and the lower surface of the anode electrode plate 2211 having the indentations 2211a and 2211b respectively with a first separator 2213 and a second separator 2214. When manufacturing the electrode assembly 22, for the anode electrode plate 2211 provided with the indentations 2211a and 2211b, the upper surface may be covered with the first separator 2213 and the lower surface may be covered with the second separator 2214. For example, the device 300 may include anode combining rolls 301. The covered anode electrode plate 2211 is combined with the first separator 2213 and the second separator 2214 by means of the anode combining rolls 301.

Further, the method for manufacturing an electrode assembly according to the embodiments of the present application or the method 100 according to the embodiments of the present application may further include: arranging, according to the positions of the indentations 2211a and 2211b of the anode electrode plate 2211, the plurality of cut first electrode plates 221b sequentially on an upper surface of the first separator 2213 and a lower surface of the second separator 2214, such that each of the plurality of anode electrode plate areas is correspondingly provided with one first electrode plate 221b, the anode electrode plate 2211 is configured to be bent at the indentations such that the plurality of anode electrode plate areas and the plurality of first electrode plates 221b are alternately stacked in the first direction X, and the first separator 2213 and the second separator 2214 are configured to isolate each anode electrode plate area from the corresponding first electrode plate 221b.

As shown in FIGS. 4 and 5, a plurality of first electrode plates 221b may be obtained by cutting the first electrode plate assembly 2212; and according to the positions of the indentations 2211a and 2211b of the anode electrode plate 2211, the plurality of cut first electrode plates 221b may be sequentially arranged on the upper surface of the first separator 2213 and the lower surface of the second separator 2214, respectively. For example, the device 300 according to the embodiments of the present application may include two cathode plate making mechanisms for cutting the first electrode plate assembly 2212. One of the cathode plate making mechanisms is configured to cut a first electrode plate assembly 2212, and the first electrode plates 221b obtained after cutting are arranged on the upper surface of the first separator 2213; and the other cathode plate making mechanism may be configured to cut another first electrode plate assembly 2212, and the first electrode plates 221b obtained after cutting are arranged on the lower surface of the second separator 2214. Moreover, the first electrode plates 221b cut by the two cathode plate making mechanisms are arranged at intervals.

As shown in FIGS. 4 and 5, the cut first electrode plates 221b, the first separator 2213, the anode electrode plate 2211 and the second separator 2214 are combined by the cathode combining rolls 306, and then freely fall and are stacked, so that the electrode assembly 22 can be formed. Specifically, since the anode electrode plate 2211 is provided with the indentations 2211a and 2211b, in the process of free-falling and stacking, repeated bending operations are performed in different directions at the indentations 2211a and 2211b, so that the electrode assembly 22 as shown in FIG. 4 can be formed.

Optionally, as shown in FIG. 5, for any of the cathode plate making mechanisms in the embodiments of the present application, the cathode plate making mechanism may include: a cathode electrode plate driving mechanism 303, a cathode electrode plate cutter 304 and a cathode electrode plate conveying mechanism 305. Specifically, the cathode electrode plate driving mechanism 303, the cathode electrode plate cutter 304 and the cathode electrode plate conveying mechanism 305 may be a linkage apparatus. For example, a servo shaft of the cathode electrode plate conveying mechanism 305 and a servo shaft of the cathode electrode plate cutter 304 are respectively cam-coupled to a main axis of the linkage apparatus. The main axis of the linkage apparatus is moved according to a preset cam movement profile.

It should be understood that the main axis of the linkage apparatus is an imaginary axis. In an ideal state without errors, as the main axis periodically rotates one round (that is, rotates) 360°, the cathode electrode plate driving mechanism 303 completes the cutting of a first electrode plate 221b with a standard width, and the linkage apparatus completes a reciprocating movement. However, in the actual manufacturing process, due to possible problems such as tab misalignment, the movement of the cathode electrode plate driving mechanism 303 is the combined movement of the movement of the main axis of the linkage apparatus and a compensation axis. The compensation axis is also an imaginary axis. The tab misalignment adjustment according to the embodiments of the present application can be realized by the cathode electrode plate driving mechanism 303 controlling the increase or decrease of the cutting position of the first electrode plate assembly 2212 in each cycle.

A method 100 for correcting positions of tabs of an electrode assembly according to an embodiment of the present application will be described in detail below. The method 100 may include: a step S110 of determining whether there are a plurality of consecutive tabs misaligned with each other in a first electrode plate assembly. Specifically, S110 may specifically include: determining, according to a difference between i-th position data of an i-th tab in the first electrode plate assembly and preset position data, whether the i-th tab is subjected to misaligned lagging or leading, the i-th position data indicating a relative positional relationship between the i-th tab and a preset reference object, where i is a positive integer; and determining, if it is determined that each of the i-th tab to an (i+j)-th tab is subjected to misaligned lagging or leading, that there are the plurality of consecutive tabs misaligned with each other in the first electrode plate assembly, wherein the plurality of consecutive tabs are the i-th tab to the (i+j)-th tab. That is to say, whether there are a plurality of consecutive tabs misaligned with each other can be determined by determining whether each of the i-th tab to the (i+j)-th tab is subjected to misaligned lagging or leading, so as to adjust, in a timely manner, the position where the first electrode plate assembly is cut when there are a plurality of consecutive tabs misaligned with each other, and then adjust the positions of the tabs.

It should be understood that the i-th tab in the embodiments of the present application is the tab of the uncut part of the first electrode plate assembly, and the i-th tab may be counted from the uncut part. For example, the i-th tab may represent the i-th tab of the uncut part of the first electrode plate assembly. Alternatively, the i-th tab may also be counted from the beginning of the first electrode plate assembly. For example, the tab before the i-th tab includes the tab of the cut part and the tab of the uncut part of the first electrode plate assembly. The embodiments of the present application are not limited thereto.

Optionally, before S110, the method 100 may further include: determining the i-th position data, that is, determining the position of the i-th tab relative to a preset reference object.

Optionally, as shown in FIG. 5, the device 300 may include a tab detection sensor 302. The tab detection sensor 302 may be configured to detect a tab. For example, the tab detection sensor 302 may be configured to sense a tab, and when a tab is sensed, a sensing signal is sent to a processing unit such that the processing unit can determine the position of the tab. The processing unit may be a processor or a controller. For example, the processing unit may be a programmable logic controller (PLC), but the embodiments of the present application are not limited thereto.

Specifically, the i-th tab in the embodiments of the present application may be any tab of the uncut part of the first electrode plate assembly 2212. The preset reference object in the embodiments of the present application may be selected according to actual applications. For example, as shown in FIG. 5, the preset reference object may be the anode electrode plate area corresponding to the first electrode plate where the i-th tab is located. For the uncut part of the first electrode plate assembly 2212, according to a cutting rule, the first electrode plate 221b corresponding to the i-th tab may be determined in advance, and the anode electrode plate area corresponding to the first electrode plate 221b and included in the anode electrode plate 2211 may also be determined. Therefore, the relative positional relationship between the i-th tab and the corresponding anode electrode plate area may be determined as the i-th position data of the i-th tab. For example, the i-th position data may be an angle difference or a distance difference between a central axis of symmetry of the i-th tab and a central axis of symmetry of the corresponding anode electrode plate area. The embodiments of the present application are not limited thereto. The angle difference may be determined on the basis of a rotation angle of the cathode electrode plate driving mechanism 303 without any compensation movement. The distance difference may a distance difference between the central axis of symmetry of the i-th tab and the central axis of symmetry of the corresponding anode electrode plate area when the i-th tab and the anode electrode plate areas are stacked to form the electrode assembly 22 provided that the i-th tab is not subjected to any misalignment compensation.

It should be understood that if there is no tab misalignment problem in the first electrode plate assembly 2212, the relative position of the tab of each first electrode plate and the corresponding anode electrode plate area is the same, that is, the i-th position data of the i-th tab is equal to the preset position data. However, if there is a tab misalignment problem, the relative position of the i-th tab relative to the corresponding anode electrode plate area will change, that is, the i-th position data of the i-th tab is different from the preset position data, for example, it will be greater or less than the preset position data.

Optionally, as shown in FIG. 5, the preset reference object may also be the indentation corresponding to the first electrode plate where the i-th tab is located. Since the distribution pitch of the plurality of indentations 2211a and 2211b of the anode electrode plate 2211 is equal to the width of the anode electrode plate area, the preset reference object may also be configured as the indentations 2211a and 2211b. Specifically, for the uncut part of the first electrode plate assembly 2212, according to the cutting rule, the first electrode plate 221b corresponding to the i-th tab may be determined in advance, the anode electrode plate area corresponding to the first electrode plate 221b and included in the anode electrode plate 2211 may also be determined, and the two indentations adjacent to the anode electrode plate area then may be used as the preset reference object. For example, if the first electrode plate 221b corresponding to the i-th tab is arranged on the upper surface of the anode electrode plate 2211, it is possible to select, among the two indentations configured to form the anode electrode plate area corresponding to the first electrode plate 221b, the indentation 2211a located on the upper surface as the preset reference object, or to select the indentation between the anode electrode plate area and the previous anode electrode plate area as the preset reference object. Correspondingly, if the first electrode plate 221b corresponding to the i-th tab is arranged on the lower surface of the anode electrode plate 2211, it is possible to select, among the two indentations configured to form the anode electrode plate area corresponding to the first electrode plate 221b, the indentation 2211b located on the lower surface as the preset reference object, or to select the indentation between the anode electrode plate area and the previous anode electrode plate area as the preset reference object. By "previous anode electrode plate area" refers to the anode electrode plate area in the anode electrode plate 2211 that passes through the cathode combining rolls 306 earlier.

Further, the relative positional relationship between the i-th tab and the corresponding indentation 2211a or 2211b is determined as the i-th position data of the i-th tab. For example, the i-th position data may be an angle difference or a distance difference between a central axis of symmetry of the i-th tab and the corresponding indentation. The embodiments of the present application are not limited thereto. The angle difference may be determined on the basis of a rotation angle of the cathode electrode plate driving mechanism 303 without any compensation movement. The distance difference may a distance difference between the central axis of symmetry of the i-th tab and the corresponding indentation when the i-th tab and the anode electrode plate areas are stacked to form the electrode assembly 22 provided that the i-th tab is not subjected to any misalignment compensation.

It should be understood that if there is no tab misalignment problem in the first electrode plate assembly 2212, the relative position of the tab of each first electrode plate and the corresponding indentation is the same, that is, the i-th position data of the i-th tab is equal to the preset position data. However, if there is a tab misalignment problem, the relative position of the i-th tab relative to the corresponding indentation will change, that is, the i-th position data of the i-th tab is different from the preset position data, for example, it will be greater or less than the preset position data.

Optionally, determining the i-th position data may include: determining a moment when the i-th tab is detected as a target moment; and determining that at the target moment, a positional relationship between the position of the i-th tab and the preset reference object is the i-th position data. From the tab detection sensor 302 sensing a tab and sending a sensing signal to a processing unit to the processing unit receiving the signal, there may be a time difference required for signal transmission. The time difference will cause the processing unit to determine the inaccurate i-th position data of the i-th tab. Therefore, by adding a timestamp to the sensing signal sent when the tab detection sensor 302 senses the tab, it is possible to reduce or avoid calculation errors.

Specifically, it is determined that the moment when the i-th tab is detected is the target moment, that is, the moment when the tab detection sensor 302 senses a tab is determined as the target moment, and the target moment can be recorded by adding a timestamp or the like, such that the processing unit receives the sensing signal of the tab and determines the target moment on the basis of the timestamp. When the target moment is determined, the positional relationship between the position of the i-th tab and the preset reference object is the i-th position data, instead of calculating the moment when the tab sensing signal is received. The positional relationship between the position of the i-th tab and the preset reference object is the i-th position data, preventing the time difference caused by the transmission of the sensing signal from causing a too large calculation error.

In the embodiments of the present application, in S110, it is possible to determine, according to a difference between i-th position data of an i-th tab and preset position data, whether the i-th tab is subjected to misaligned lagging or leading. Specifically, if the difference between the i-th position data and the preset position data is greater than or equal to a fifth threshold, the fifth threshold being greater than zero, it is determined that the i-th tab is subjected to misaligned lagging; and if the difference between the i-th position data and the preset position data is less than or equal to a sixth threshold, the sixth threshold being less than zero, it is determined that the i-th tab is subjected to misaligned leading.

It should be understood that in the embodiments of the present application, the difference between the i-th position data of the i-th tab and the preset position data is obtained by subtracting the preset position data from the i-th position data of the i-th tab. The difference between the i-th position data of the i-th tab and the preset position data may be positive or negative.

If the difference between the i-th position data and the preset position data is greater than or equal to the fifth threshold, it means that the position of the i-th tab is too far from the preset reference object, that is, the i-th tab is subjected to misaligned lagging with respect to the correct position. On the contrary, if the difference between the i-th position data and the preset position data is less than or equal to the sixth threshold, it means that the position of the i-th tab is too close to the preset reference object, that is, the i-th tab is subjected to misaligned leading with respect to the correct position.

Optionally, the fifth threshold and the sixth threshold in the embodiments of the present application may be set according to actual applications. For example, the absolute value of the fifth threshold may be set to be equal to the absolute value of the sixth threshold. For another example, when the tab error does not affect the performance of the electrode assembly too much, the value range of the fifth threshold may be set to [0.3 mm, 2 mm]. For example, the fifth threshold may be set to 0.5 mm (millimeters) or 1 mm. Similarly, the value range of the sixth threshold may be [−2 mm, −0.3 mm]. For example, the sixth threshold may be set to 0.5 mm or 1 mm.

In S120 according to the embodiments of the present application, if there are a plurality of consecutive tabs misaligned with each other, for example, if it is determined that each of the i-th tab to the (i+j)-th tab is subjected to misaligned lagging or leading, the cutting position of the first electrode plate assembly is adjusted, to adjust a width and stacking positions of first electrode plates obtained after cutting, such that tabs of a plurality of first electrode plates obtained after cutting the first electrode plate assembly are aligned with each other. The number of tabs of the plurality of consecutive tabs may be set according to actual applications. In other words, the value range of j may be set according to actual applications. For example, in order to avoid the wrinkling or bending of only an individual tab, the tabs are generally corrected only when each of a plurality of consecutive tabs is subjected to misaligned lagging or leading. For example, j may be set to an integer greater than or equal to 1. For example, j may be set to 2, 5, 8 or other numerical values.

The cutting direction of the first electrode plate assembly in the embodiments of the present application means that in each cutting process of the first electrode plate assembly, the first electrode plate assembly is cut in this direction to obtain one first electrode plate. The cutting direction of the first electrode plate assembly, the width direction of the first electrode plate 221b and the stacking first direction X of the electrode assembly 22 are perpendicular to each other or mutually perpendicular.

Specifically, S120 may specifically include: delaying, if each of the plurality of consecutive tabs is subjected to misaligned lagging and the number of tabs of the plurality of consecutive tabs is greater than or equal to a first threshold, the cutting position of the first electrode plate assembly to increase the width of the first electrode plates obtained after cutting, such that the tabs of the plurality of first electrode plates are aligned with each other. Taking an example in which the plurality of consecutive tabs are the i-th tab to the (i+j)-th tab, if it is determined that each of the i-th tab to the (i+j)-th tab is subjected to misaligned lagging, and j is greater than or equal to a first threshold, the cutting position of the first electrode plate assembly is delayed, to increase the width of the first electrode plates obtained after cutting, and adjust the stacking positions of the first electrode plates obtained after cutting, such that the tabs of the plurality of first electrode plates are aligned with each other. Optionally, the first threshold in the embodiments of the present application may be set according to actual applications. For example, the first threshold may be any positive integer. For example, the first threshold may be set to 2, 3, 5 or other numerical values. In addition, by setting the first threshold, it is possible to avoid that, when only an individual tab is subjected to misaligned lagging, or when an individual tab is wrinkled, it is wrongly determined that the position of the tab needs to be adjusted, so that the accuracy of correction can be improved.

It should be understood that when determining whether the i-th tab is subjected to misaligned lagging or leading, the first electrode plate 221b corresponding to the i-th tab is not cut, and when determining whether the (i+j)-th tab is subjected to misaligned lagging or leading, the first electrode plate 221b corresponding to the i-th tab may not have been cut, or may have been cut. Therefore, when it is determined that each of the i-th tab to the (i+j)-th tab is subjected to misaligned lagging, and j is greater than or equal to the first threshold, the uncut part of the first electrode plate assembly 2212 may be adjusted. For example, the first electrode plate 221b of the first electrode plate assembly 2212 that is about to be cut by the cathode electrode plate cutter 304 may be adjusted, that is, the cutting position of the first electrode plate 221b that is currently being cut is delayed, to increase the width of the first electrode plates obtained after cutting, so as to adjust, in a timely manner, the positions of the misaligned lagging tabs of the first electrode plates 221b; or the first electrode plate 221b of the first electrode plate assembly 2212 that corresponds to the (i+j)-th tab may be adjusted, that is, the cutting position of the first electrode plate 221b corresponding to the (i+j)-th tab is delayed, to increase the width of the first electrode plates obtained after cutting. In this way, for the situation that the part that is about to be cut may be not subjected to misaligned lagging, premature adjustment can be avoided from causing tab misalignment, but the embodiments of the present application are not limited thereto.

Optionally, if the adjustment is to delay the cutting position of the first electrode plate assembly 2212, the cutting delaying operation can be continued, that is, the delayed cutting is continuously performed on a plurality of first electrode plates 221b.

Optionally, when the cutting delaying operation is performed on the first electrode plate assembly 2212, the distance by which the cutting position of the first electrode plate assembly is delayed may be set according to actual applications. For example, the distance by which the cutting position of the first electrode plate assembly 2212 is delayed is a first preset distance, and the first preset distance is less than or equal to five thousandths of a preset standard width of the first electrode plate 221b, so as to avoid that the excessive magnitude of misalignment adjustment caused by the too large delay distance leads to the adjustment from an original misaligned lagging state into a misaligned leading state, which will still lead to the unqualified manufacturing of the electrode assembly. In addition, it is also possible to avoid the excessive width of the cut first electrode plate 221b caused by too large delay distance, and the too large width of the first electrode plate 221b may cause lithium plating during the use of the battery cell 20. The preset standard width of the first electrode plate 221b is the original width of the first electrode plate 221b without performing any delaying or advancing operation on the first electrode plate assembly 2212.

Optionally, the cutting delaying operation may be performed on the first electrode plate assembly 2212 in various ways. For example, by increasing the rotation speed of the cathode electrode plate driving mechanism 303, the rotation angle of the cathode electrode plate driving mechanism 303 is increased in a working cycle, thereby delaying the cutting position of the cathode electrode plate cutter 304 and increasing the width of the cut first electrode plates 221b. Moreover, the stacking position of the first electrode plate 221b may also be changed during stacking, so that the position of the tab that would originally be lagging can be compensated to reduce or avoid the tab lagging misalignment problem.

Optionally, S120 may further specifically include: advancing, if each of the plurality of consecutive tabs is subjected to misaligned leading and the number of tabs of the plurality of consecutive tabs is greater than or equal to a second threshold, the cutting position of the first electrode plate assembly to reduce the width of the first electrode plates obtained after cutting, such that the tabs of the plurality of first electrode plates are aligned with each other. Still taking the i-th tab to the (i+j)-th tab as an example, if it is determined that each of the i-th tab to the (i+j)-th tab is subjected to misaligned leading, and j is greater than or equal to a second threshold, the cutting position of the first electrode plate assembly is advanced, to reduce the width of the first electrode plates obtained after cutting, and adjust the stacking positions of the first electrode plates obtained after cutting, such that the tabs of the plurality of first electrode plates are aligned with each other. Optionally, the second threshold in the embodiments of the present application may be set according to actual applications. For example, the second threshold may be any positive integer. For example, the second threshold may be equal to the first threshold. For another example, the second threshold may be set to 2, 3, 5 or other numerical values. In addition, by setting the second threshold, it is possible to avoid that, when only an individual tab is subjected to misaligned leading, or when an individual tab is wrinkled, it is wrongly determined that the position of the tab needs to be adjusted, so that the accuracy of correction can be improved.

It should be understood that, similar to the aforementioned case of misaligned lagging, when determining whether the i-th tab is subjected to misaligned lagging or leading, the first electrode plate 221b corresponding to the i-th tab is not cut, and when determining whether the (i+j)-th tab is subjected to misaligned lagging or leading, the first electrode plate 221b corresponding to the i-th tab may not have been cut, or may have been cut. Therefore, when it is determined that each of the i-th tab to the (i+j)-th tab is subjected to misaligned leading, and j is greater than or equal to the second threshold, the uncut part of the first electrode plate assembly 2212 may be adjusted. For example, the first electrode plate 221b of the first electrode plate assembly 2212 that is about to be cut by the cathode electrode plate cutter 304 may be adjusted, that is, the cutting position of the first electrode plate 221b that is currently being cut is advanced, to reduce the width of the first electrode plates obtained after cutting, so as to adjust, in a timely manner, the positions of the misaligned leading tabs of the first electrode plates 221b; or the first electrode plate 221b of the first electrode plate assembly 2212 that corresponds to the (i+j)-th tab may be adjusted, that is, the cutting position of the first electrode plate 221b corresponding to the (i+j)-th tab is advanced, to reduce the width of the first electrode plates obtained after cutting. In this way, for the situation that the part that is about to be cut may be not subjected to misaligned leading, premature adjustment can be avoided from causing tab misalignment, but the embodiments of the present application are not limited thereto.

Optionally, if the adjustment is to advance the cutting position of the first electrode plate assembly 2212, the cutting advancing operation can be continued, that is, the advanced cutting is continuously performed on a plurality of first electrode plates 221b.

Optionally, taking FIG. 6 as an example, FIG. 6 shows an uncut part of the first electrode plate assembly 2212. The dotted lines in FIG. 6 indicate preset cutting positions. It can be seen that if the actual cutting is carried out along the dotted lines, the positions of the tabs in FIG. 6 are subjected to misaligned leading, which will lead to serious misalignment of the tabs of the manufactured electrode assembly 22. Therefore, an advance operation is required. Here, an example is taken in which the first electrode plate 221b corresponding to an m-th tab needs to be cut in advance, the cutting position of the first electrode plate 221b of the first electrode plate assembly 2212 that corresponds to the m-th tab and was originally cut according to the width H is advanced by an advance distance of ΔH, so that the width of the first electrode plate 221b obtained by actual cutting is less than the originally preset width H. Similarly, for the first electrode plate 221b corresponding to the (m+1)-th tab, the cutting position thereof may also be advanced, and the advance distance may still be set to ΔH. By analogy, the cutting advancing operation may be performed on the first electrode plates 221b corresponding to a plurality of subsequent tabs. For example, in FIG. 6, an example is taken in which the cutting advancing operation is performed on the first electrode plates 221b corresponding to at least four tabs. In this way, the original cutting positions of the dotted lines are changed to the positions of the solid lines corresponding to the dotted lines for actual cutting, so that the problem of tab misaligned leading can be solved, preventing the manufactured electrode assembly 22 from being unqualified.

Optionally, when the cutting advancing operation is performed on the first electrode plate assembly 2212, the distance by which the cutting position of the first electrode plate assembly is advanced may be set according to actual applications. For example, the distance by which the cutting position of the first electrode plate assembly 2212 is advanced is a second preset distance, and the second preset distance is less than or equal to five thousandths of the preset standard width of the first electrode plate 221b, so as to avoid that the excessive magnitude of misalignment adjustment caused by the too large advance distance leads to the adjustment from an original misaligned leading state into a misaligned lagging state, which will still lead to the unqualified manufacturing of the electrode assembly. In addition, it is also to avoid that the width of the first electrode plate 221b is too small due to the too large advance distance, which seriously affects the capacity of the battery cells 20 after the electrode assembly 22 are assembled into a battery cell 20. The preset standard width of the first electrode plate 221b is the original width of the first electrode plate 221b without performing any delaying or advancing operation on the first electrode plate assembly 2212. For example, if the preset cutting positions indicated by the dotted lines in the first electrode plate assembly 2212 in FIG. 6 are the positions without any advance or lag processing, the preset standard width is equal to the width H.

Optionally, the cutting advancing operation may be performed on the first electrode plate assembly 2212 in various ways. For example, by decreasing the rotation speed of the cathode electrode plate driving mechanism 303, the rotation angle of the cathode electrode plate driving mechanism 303 is decreased in a working cycle, thereby advancing the cutting position of the cathode electrode plate cutter 304 and reducing the width of the cut first electrode plates 221b. Moreover, the stacking position of the first electrode plate 221b may also be changed during stacking, so that the position of the tab that would originally be leading is compensated to reduce or avoid the tab leading misalignment problem.

In the embodiments of the present application, S120 may further specifically include: stopping, if each of the plurality of consecutive tabs is subjected to misaligned lagging and the number of tabs of the plurality of consecutive tabs is greater than or equal to a third threshold, the operation of advancing the cutting position of the first electrode plate assembly, the third threshold being less than or equal to the first threshold. Still taking the i-th tab to the (i+j)-th tab as an example, if it is determined that each of the i-th tab to the (i+j)-th tab is subjected to misaligned lagging, and j is greater than or equal to a third threshold, the operation of advancing the cutting position of the first electrode plate assembly is stopped. Optionally, the third threshold in the embodiments of the present application may be set according to actual applications. For example, the third threshold may be set to any positive integer less than or equal to the first threshold. For example, the third threshold may be set to 2, 3, 5 or other numerical values.

It should be understood that, based on the manufacturing process of the first electrode plate assembly 2212 and the formation method of the tabs, in the process of continuous cutting, if it is determined according to the aforementioned method 100 that each of the i-th tab to the (i+j)-th tab is subjected to misaligned lagging or leading, it is likely that all the tabs after the (i+j)-th tab are also subjected to misaligned lagging or leading. Therefore, the first electrode plate assembly 2212 can be continuously corrected for the positions of the tabs, that is, continuing to perform the corresponding cutting delaying operation or cutting advancing operation.

However, other situations may also exist during the tab correction process. For example, in the process of performing the cutting advancing operation on the first electrode plate assembly 2212 to correct the tabs, if it is determined that a plurality of uncut consecutive tabs are subjected to misaligned lagging, the original cutting advancing operation should be stopped, so as to avoid the tab misalignment caused by continuing to perform the cutting advancing operation. That is, if it is determined that each of the i-th tab to the (i+j)-th tab is subjected to misaligned lagging, and j is greater than or equal to the third threshold, the operation of advancing the cutting position of the first electrode plate assembly 2212 may be stopped first. The third threshold is less than or equal to the first threshold. In this way, if the (i+j+1)-th tab after the (i+j)-th tab is still subjected to misaligned lagging, it is possible to choose to perform the cutting delaying operation according to the number of subsequent misaligned lagging consecutive tabs and the first threshold, to correct the tab; or if the (i+j+1)-th tab after the (i+j)-th tab is no longer subjected to misaligned lagging nor to misaligned leading, the current cutting advancing operation can be stopped, and the tab can be located in the normal position without the need for performing the cutting delaying operation.

Similarly, in the embodiments of the present application, S120 may further specifically include: stopping, if each of the plurality of consecutive tabs is subjected to misaligned leading and the number of tabs of the plurality of consecutive tabs is greater than or equal to a fourth threshold, the operation of delaying the cutting position of the first electrode plate assembly, the fourth threshold being less than or equal to the second threshold. Still taking the i-th tab to the (i+j)-th tab as an example, if it is determined that each of the i-th tab to the (i+j)-th tab is subjected to misaligned leading, and j is greater than or equal to a fourth threshold, the operation of delaying the cutting position of the first electrode plate assembly is stopped. Optionally, the fourth threshold in the embodiments of the present application may be set according to actual applications. For example, the fourth threshold may be set to any positive integer less than or equal to the second threshold. For example, the fourth threshold may be set to 2, 3, 5 or other numerical values. For another example, the fourth threshold may be equal to the third threshold.

In the process of performing the cutting delaying operation on the first electrode plate assembly 2212 to correct the tabs, if it is determined that a plurality of uncut consecutive tabs are subjected to misaligned leading, the original cutting delaying operation should be stopped, so as to avoid the tab misalignment caused by continuing to perform the cutting delaying operation. That is, if it is determined that each of the i-th tab to the (i+j)-th tab is subjected to misaligned leading, and j is greater than or equal to the fourth threshold, the operation of delaying the cutting position of the first electrode plate assembly 2212 may be stopped first. The fourth threshold is less than or equal to the second threshold. In this way, if the (i+j+1)-th tab after the (i+j)-th tab is still subjected to misaligned leading, it is possible to choose to perform the cutting advancing operation according to the number of subsequent consecutive misaligned leading tabs and the second threshold, to correct the tab; or if the (i+j+1)-th tab after the (i+j)-th tab is no longer subjected to misaligned leading nor to misaligned lagging, the current cutting delaying operation can be stopped, and the tab can be located in the normal position without the need for performing the cutting advancing operation.

Figure 7:
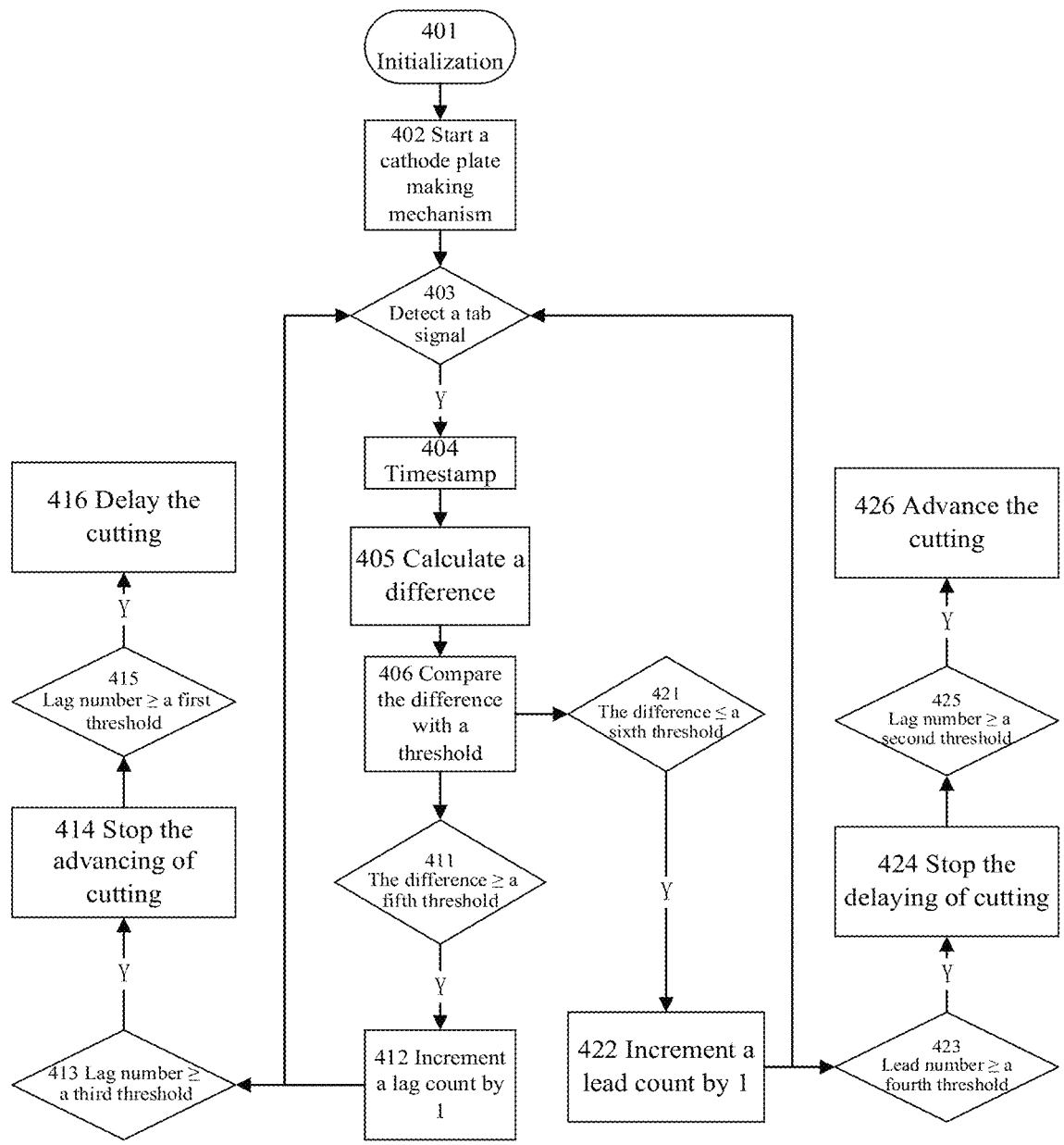
FIG. 7 is a schematic flowchart of another method for correcting positions of tabs of an electrode assembly disclosed in an embodiment of the present application.

The method 100 according to the embodiments of the present application will be described below with reference to specific embodiments. FIG. 7 shows a schematic flowchart of a method 400 for correcting positions of tabs of an electrode assembly according to an embodiment of the present application. The method 400 may be a specific application of the method 100. As shown in FIG. 7, the method 400 may include: a step 401 of initialization. That is, a device for manufacturing an electrode assembly 22 is initialized to start the manufacturing the electrode assembly 22. For example, the device 300 may be initialized to start the manufacturing of the electrode assembly 22.

As shown in FIG. 7, the method 400 may further include: a step 402 of starting a cathode plate making mechanism. That is, a device for cutting a cathode electrode plate is turned on. For example, a tab detection sensor 302, a cathode electrode plate driving mechanism 303, a cathode electrode plate cutter 304 and a cathode electrode plate conveying mechanism 305 in the device 300 are turned on, to start the cutting of the cathode electrode plate, that is, cutting a first electrode plate assembly 2212 to obtain a plurality of first electrode plates 221*b*.

As shown in FIG. 7, the method 400 may further include: a step 403 of detecting a tab signal. That is, the tab detection sensor 302 may be used to sense a tab of an uncut part of the first electrode plate assembly 2212 to detect the obtained tab signal. For example, an example is taken in which the tab detection sensor 302 senses the i-th tab of the first electrode plate assembly 2212.

As shown in FIG. 7, the method 400 may further include: a step 404 of timestamp. That is, when the tab detection sensor 302 senses the i-th tab signal, a timestamp may be added to the signal to identify a target moment when the i-th tab is detected, so that a processing unit that receives and acquires the signal can determine i-th position data of the i-th tab according to the target moment. The i-th position data represents the relative positional relationship between the i-th tab and a preset reference object.

Optionally, the way of determining the i-th position data of the i-th tab is the same with the description of the corresponding step in the method 100, and will not be repeated here.

As shown in FIG. 7, the method 400 may further include: a step 405 of calculating a difference. That is, a difference between the i-th position data and preset position data is calculated. Optionally, this step is the same with the description of the corresponding step in the method 100, and will not be repeated here.

As shown in FIG. 7, the method 400 may further include: a step 406 of comparing the difference with a threshold. That is, the difference between the i-th position data and the preset position data is compared with a fifth threshold and a sixth threshold respectively, for continuing to execute step 411 or step 421.

As shown in FIG. 7, the method 400 may further include: a step 411 of determining whether the difference≥the fifth threshold. That is, when the difference between the i-th position data and the preset position data is greater than or equal to the fifth threshold, continue to execute step 412. The fifth threshold is greater than zero. For example, the fifth threshold may be set to 0.3 mm or 0.5 mm.

As shown in FIG. 7, the method 400 may further include: a step 412 of incrementing a lag count by 1. That is, when the difference between the i-th position data and the preset position data is greater than or equal to the fifth threshold, it is determined that the i-th tab is subjected to misaligned lagging, so the lag count may be incremented by 1. For example, if the i-th tab is the first lagging tab detected initially, the lag count is increased from 0 to 1, and so on, to count the number of consecutive misaligned lagging tabs.

It should be understood that, when it is determined that one tab or a plurality of consecutive tabs is/are subjected to misaligned lagging, but the number of tabs does not exceed the third threshold, if there is a tab that is not subjected to misaligned lagging, the lag number will be cleared. Step 413 is executed when the calculated number of consecutive misaligned lagging tabs is greater than or equal to the third threshold.

As shown in FIG. 7, the method 400 may further include: a step 413 of determining whether a lag number≥the third threshold. That is, when the number of consecutive misaligned lagging tabs is greater than or equal to the third threshold, continue to execute step 414. For example, the third threshold may be set to 2 or 3.

As shown in FIG. 7, the method 400 may further include: a step 414 of stopping the advancing of cutting. That is, the cutting advancing operation of the first electrode plate assembly 2212 is stopped. It should be understood that it is possible that a cutting-advancing correction process is being performed on the first electrode plate assembly 2212; therefore, in step 414, the cutting advancing operation may be stopped. Alternatively, it is possible that no cutting-advancing correction process is currently performed on the first electrode plate assembly 2212, step 414 then may not be executed, and the number of consecutive misaligned lagging tabs continues to be counted until the number is greater than or equal to the first threshold, then continue to execute step 415.

As shown in FIG. 7, the method 400 may further include: a step 415 of determining whether a lag number≥a first threshold. That is, when the number of consecutive misaligned lagging tabs is greater than or equal to the first threshold, continue to execute step 416. For example, the first threshold may be set to 3 or 5. For example, the first threshold may be greater than the third threshold.

As shown in FIG. 7, the method 400 may further include: a step 416 of delaying the cutting. That is, when it is determined that a tab of the first electrode plate assembly 2212 is subjected to misaligned lagging, and the position of the tab needs to be adjusted, it is possible that by delaying the cutting position, the width of the first electrode plates 221*b* obtained by cutting is increased, and the positions of the first electrode plates 221*b* are changed during subsequent stacking, thereby realizing tab correction.

Optionally, the delay distance of the cutting delaying operation may be set according to actual applications. For example, the delay distance may be set to 1 mm or 0.5 mm. For another example, the delay distance may be less than the fifth threshold. For another example, the delay distance can make the width of the cathode electrode plate 221*b* in the stacked electrode assembly 22 less than the width of the corresponding stacking section 221*d*, so as to avoid lithium plating. For example, the value range of the difference between the width of the cathode electrode plate 221*b* in the stacked electrode assembly 22 and the width of the corresponding stacking section 221*d* is [4 mm, 6 mm].

As shown in FIG. 7, on the contrary to step 411, the method 400 may further include: a step 421 of determining whether the difference≤a sixth threshold. That is, when the difference between the i-th position data and the preset position data is less than or equal to the sixth threshold, continue to execute step 422. The sixth threshold is less than zero. For example, the sixth threshold may be set to −0.3 mm or −0.5 mm.

As shown in FIG. 7, the method 400 may further include: a step 422 of incrementing a lead count by 1. That is, when the difference between the i-th position data and the preset position data is less than or equal to the fifth threshold, it is determined that the i-th tab is subjected to misaligned leading, so the lead count may be incremented by 1. For example, if the i-th tab is the first misaligned leading tab detected initially, the lead count is increased from 0 to 1, and so on, to count the number of consecutive misaligned leading tabs.

It should be understood that, when it is determined that one tab or a plurality of consecutive tabs is/are subjected to misaligned leading, but the number of tabs does not exceed the fourth threshold, if there is a tab that is not subjected to misaligned leading, the lead count will be cleared. Step 423 is executed when the calculated number of consecutive leading tabs is greater than or equal to the fourth threshold.

As shown in FIG. 7, the method 400 may further include: a step 423 of determining whether a lead number≥the fourth threshold. That is, when the number of consecutive misaligned leading tabs is greater than or equal to the fourth threshold, continue to execute step 425. For example, the fourth threshold may be set to 2 or 3.

As shown in FIG. 7, the method 400 may further include: a step 424 of stopping the delaying of cutting. That is, the cutting delaying operation of the first electrode plate assembly 2212 is stopped. It should be understood that it is possible that a cutting-delaying correction process is being performed on the first electrode plate assembly 2212, for example, the tab of the first electrode plate assembly 2212 has lagged and a cutting delaying operation is required to perform tab correction; therefore, in step 424, the cutting delaying operation may be stopped. Alternatively, it is possible that no cutting-delaying correction process is currently performed on the first electrode plate assembly 2212, step 424 then may not be executed, and the number of consecutive misaligned leading tabs continues to be counted until the number is greater than or equal to the second threshold, then continue to execute step 425.

As shown in FIG. 7, the method 400 may further include: a step 425 of determining whether the lead number≥the second threshold. That is, when the number of consecutive misaligned leading tabs is greater than or equal to the second threshold, continue to execute step 426. For example, the second threshold may be set to 3 or 5. For example, the second threshold may be greater than the fourth threshold.

As shown in FIG. 7, the method 400 may further include: a step 426 of advancing the cutting. That is, when it is determined that a tab of the first electrode plate assembly 2212 is subjected to misaligned leading, and the position of the tab needs to be adjusted, it is possible that by advancing the cutting position, the width of the first electrode plates 221b obtained by cutting is reduced, and the positions of the first electrode plates 221b are changed during subsequent stacking, thereby realizing tab correction.

Optionally, the advance distance of the cutting advancing operation may be set according to actual applications. For example, the advance distance may be set to 1 mm or 0.5 mm. For another example, the advance distance may be less than the sixth threshold. For another example, the advance distance can still make the width of the cathode electrode plate 221b in the stacked electrode assembly 22 less than the width of the corresponding stacking section 221d, so as to avoid lithium plating. For example, the value range of the difference between the width of the cathode electrode plate 221b in the stacked electrode assembly 22 and the width of the corresponding stacking section 221d is [4 mm, 6 mm].

Therefore, according to the method 400 for correcting positions of tabs of an electrode assembly in the embodiments of the present application, whether the tabs are subjected to misaligned lagging or leading can be determined by determining the relative relationship between each tab and the preset reference object; and a plurality of first electrode plates with different widths can be obtained by adjusting the positions where the first electrode plates are cut if a plurality of consecutive tabs are subjected to misaligned lagging or leading; and the stacking positions of the plurality of first electrode plates can also be adjusted, and the relative positions of the tabs are then adjusted, so that the originally misaligned lagging or leading tabs can be adjusted into a substantially aligned state, avoiding the problem of unqualified manufacturing of electrode assemblies caused by tab misalignment, and therefore avoiding the problem of unqualified manufacturing of battery cells, thereby improving the manufacturing efficiency and product quality of battery cells.

The methods 100 and 400 for correcting positions of tabs of an electrode assembly according to the embodiments of the present application have been described in detail above with reference to the accompanying drawings. A device for correcting positions of tabs of an electrode assembly according to an embodiment of the present application will be described below with reference to the accompanying drawings.

Figure 8:
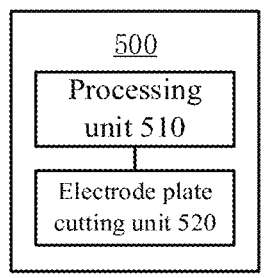
FIG. 8 is a schematic block diagram of another device for correcting positions of tabs of an electrode assembly disclosed in an embodiment of the present application.

FIG. 8 shows a schematic block diagram of a device 500 for correcting positions of tabs of an electrode assembly according to an embodiment of the present application. The electrode assembly includes anode electrode plates and cathode electrode plates stacked alternately in a first direction. As shown in FIG. 8, the device 500 according to the embodiment of the present application includes: a processing unit 510 and an electrode plate cutting unit 520. Specifically, the processing unit 510 is configured to: determine whether there are a plurality of consecutive tabs misaligned with each other in a first electrode plate assembly; and adjust, if there are a plurality of consecutive tabs misaligned with each other, a position where the first electrode plate assembly is cut by the electrode plate cutting unit 520 to adjust a width of first electrode plates obtained after cutting, such that tabs of a plurality of first electrode plates obtained after cutting the first electrode plate assembly are aligned with each other, the first electrode plates being anode electrode plates or cathode electrode plates.

Optionally, as an embodiment, the processing unit 510 is configured to: delay, if each of the plurality of consecutive tabs is subjected to misaligned lagging and the number of tabs of the plurality of consecutive tabs is greater than or equal to a first threshold, the position where the first electrode plate assembly is cut by the electrode plate cutting unit 520 to increase the width of the first electrode plates obtained after cutting, such that the tabs of the plurality of first electrode plates are aligned with each other; and/or advance, if each of the plurality of consecutive tabs is subjected to misaligned leading and the number of tabs of the plurality of consecutive tabs is greater than or equal to a second threshold, the position where the first electrode plate assembly is cut by the electrode plate cutting unit 520 to reduce the width of the first electrode plates obtained after cutting, such that the tabs of the plurality of first electrode plates are aligned with each other.

Optionally, as an embodiment, a distance by which the cutting position of the first electrode plate assembly is delayed is a first preset distance, which is less than or equal to five thousandths of a preset standard width of the first electrode plate; and/or a distance by which the cutting position of the first electrode plate assembly is advanced is a second preset distance, which is less than or equal to five thousandths of the preset standard width of the first electrode plate.

Optionally, as an embodiment, the processing unit 510 is configured to: stop, if each of the plurality of consecutive tabs is subjected to misaligned lagging and the number of tabs of the plurality of consecutive tabs is greater than or equal to a third threshold, the operation of advancing the position where the first electrode plate assembly is cut by the electrode plate cutting unit 520, the third threshold being less than or equal to the first threshold; and/or stop, if each of the plurality of consecutive tabs is subjected to misaligned leading and the number of tabs of the plurality of consecutive tabs is greater than or equal to a fourth threshold, the operation of delaying the position where the first electrode plate assembly is cut by the electrode plate cutting unit 520, the fourth threshold being less than or equal to the second threshold.

Optionally, as an embodiment, the first threshold is equal to the second threshold.

Optionally, as an embodiment, the processing unit 510 is configured to: determine, according to a difference between i-th position data of an i-th tab in the first electrode plate assembly and preset position data, whether the i-th tab is subjected to misaligned lagging or leading, the i-th position data indicating a relative positional relationship between the i-th tab and a preset reference object, where i is a positive integer; and determine, if it is determined that each of the i-th tab to an (i+j)-th tab is subjected to misaligned lagging or leading, that there are the plurality of consecutive tabs misaligned with each other in the first electrode plate assembly, wherein the plurality of consecutive tabs are the i-th tab to the (i+j)-th tab.

Optionally, as an embodiment, the processing unit 510 is configured to: determine, if the difference between the i-th position data and the preset position data is greater than or equal to a fifth threshold, that the i-th tab is subjected to misaligned lagging, the fifth threshold being greater than zero; and determine, if the difference between the i-th position data and the preset position data is less than or equal to a sixth threshold, that the i-th tab is subjected to misaligned leading, the sixth threshold being less than zero.

Optionally, as an embodiment, the processing unit 510 is further configured to: determine the i-th position data.

Optionally, as an embodiment, the processing unit 510 is configured to: determine a moment when the i-th tab is detected as a target moment; and determine that at the target moment, a positional relationship between the position of the i-th tab and the preset reference object is the i-th position data.

Optionally, as an embodiment, the first electrode plates are cathode electrode plates, and the electrode assembly includes the plurality of first electrode plates.

Optionally, as an embodiment, an upper surface and a lower surface of the anode electrode plate are alternately provided with a plurality of indentations, an anode electrode plate area is between two adjacent indentations of the plurality of indentations, and the anode electrode plate is configured to be bent at the indentations, such that a plurality of anode electrode plate areas and the plurality of cathode electrode plates are alternately stacked in the first direction.

Optionally, as an embodiment, the device 500 further includes: a first combining unit, configured to cover the upper surface and the lower surface of the anode electrode plate having the indentations respectively with a first separator and a second separator; and a second combining unit, configured to arrange, according to the positions of the indentations of the anode electrode plate, the plurality of cut first electrode plates sequentially on an upper surface of the first separator and a lower surface of the second separator, such that each of the plurality of anode electrode plate areas is correspondingly provided with one first electrode plate, the anode electrode plate is configured to be bent at the indentations such that the plurality of anode electrode plate areas and the plurality of first electrode plates are alternately stacked in the first direction, and the first separator and the second separator are configured to isolate each anode electrode plate area from the corresponding first electrode plate.

Optionally, as an embodiment, the preset reference object for determining the i-th position data of the i-th tab in the first electrode plate assembly is: the anode electrode plate area corresponding to the first electrode plate where the i-th tab is located; or the indentation corresponding to the first electrode plate where the i-th tab is located.

It should be understood that the device 500 according to the embodiments of the present application may correspond to the implementation of the methods 100 and 400 according to the embodiments of the present application, and the aforementioned and other operations and/or functions of each unit in the device 500 are used to implement the corresponding procedures in the methods 100 and 400 respectively, and the device 300 according to the embodiments of the present application may include the device 500. Details are not repeated here for the sake of brevity.

For example, the electrode plate cutting unit 520 in the device 500 corresponds to the linkage apparatus of the device 300. For example, the electrode plate cutting unit 520 may include the cathode electrode plate cutter 304 and the cathode electrode plate conveying mechanism 305, but the embodiments of the present application are not limited thereto.

For another example, the first combining unit in the device 500 may be the anode combining rolls 301 in the device 300; and the second combining unit in the device 500 may be the cathode combining rolls 306 in the device 300, but the embodiments of the present application are not limited thereto.

It should be understood that the processing unit in the embodiments of the present application may be an integrated circuit chip, which has a signal processing capability. During implementation, each step of the aforementioned method embodiment can be completed by an integrated logic circuit of hardware or an instruction in the form of software in the processing unit. For example, the processing unit may be a PLC, but the embodiments of the present application are not limited thereto.

Figure 9:
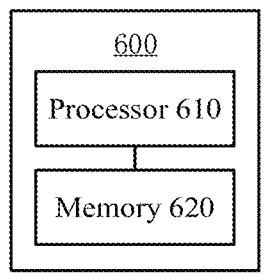
FIG. 9 is a schematic block diagram of still another device for correcting positions of tabs of an electrode assembly disclosed in an embodiment of the present application.

As shown in FIG. 9, the present application further provides a device 600 for correcting positions of tabs of an electrode assembly. The device 600 may include a processor 610 and a memory 620. The memory 620 is configured to store a computer program, and the processor 610 is configured to call the computer program to execute the methods 100 and 400 according to the embodiments of the present application.

For the specific process of correcting the tabs of the electrode assembly performed by the device 600, reference may be made to the descriptions of the methods 100 and 400 in various embodiments of the present application, and details are not repeated here for the sake of brevity.

It should be understood that the processor 610 in the embodiments of the present application may be an integrated circuit chip, which has a signal processing capability. During implementation, each step of the aforementioned method embodiment can be completed by an integrated logic circuit of hardware or an instruction in the form of software in the processor 610.

It can be understood that the memory 620 in the embodiments of the present application may be a volatile memory or a non-volatile memory, or may include both a volatile memory and a non-volatile memory.

An embodiment of the present application further provides a computer readable storage medium configured to store a computer program. Optionally, the computer readable storage medium is applicable to the device 300 or the device 500 in the embodiments of the present application, and the computer program causes a computer to execute the corresponding procedures in the various methods according to the embodiments of the present application. Details are not repeated here for the sake of brevity.

An embodiment of the present application further provides a computer program product, including computer program instructions. Optionally, the computer program product is applicable to the device 300 or the device 500 in the embodiments of the present application, and the computer program instructions cause a computer to execute the corresponding procedures in the various methods according to the embodiments of the present application. Details are not repeated here for the sake of brevity.

An embodiment of the present application further provides a computer program. Optionally, the computer program is applicable to the device 300 or the device 500 in the embodiments of the present application. The computer program, when running on a computer, causes the computer to execute the corresponding procedures in the various methods according to the embodiments of the present application. Details are not repeated here for the sake of brevity.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A method for correcting positions of tabs of an electrode assembly, wherein the electrode assembly comprises a plurality of first electrode plates and a second electrode plate, an upper surface and a lower surface of the second electrode plate are alternately provided with a plurality of indentations, a second electrode plate area is between every two adjacent indentations of the plurality of indentations, and the second electrode plate is configured to be bent at the indentations, such that a plurality of the second electrode plate areas and the plurality of the first electrode plates are alternately stacked in a first direction, and the method comprises:

covering the upper surface and the lower surface of the second electrode plate having the indentations respectively with a first separator and a second separator;

arranging, according to the positions of the indentations of the second electrode plate, the plurality of first electrode plates sequentially on an upper surface of the first separator and a lower surface of the second separator, such that each of the plurality of the second electrode plate areas is correspondingly provided with one of the first electrode plates, the plurality of the second electrode plate areas and the plurality of first electrode plates are alternately stacked in the first direction, and the first separator and the second separator are configured to isolate each anode electrode plate area from the corresponding first electrode plate;

determining whether there are a plurality of consecutive tabs misaligned with each other in a first electrode plate assembly, the first electrode plate assembly having a plurality of tabs; and adjusting, if there are a plurality of consecutive tabs misaligned with each other, a cutting position of the first electrode plate assembly to adjust a width of at least one of the plurality of first electrode plates obtained after cutting the first electrode plate assembly, such that each one of the plurality of first electrode plates obtained after cutting the first electrode plate assembly according to the adjusted cutting position has one of the plurality of tabs, the tabs of the first electrode plates are aligned with each other, wherein the first electrode plates are anode electrode plates and the second electrode plate is a continuous cathode electrode plate, or the first electrode plates are cathode electrode plates and the second electrode plate is a continuous anode electrode plate.

2. The method according to claim 1, wherein adjusting, if there are a plurality of consecutive tabs of the first electrode plate misaligned with each other, the cutting position of the first electrode plate assembly comprises:

delaying, if each of the plurality of consecutive tabs is subjected to lagging and a number of tabs of the plurality of consecutive tabs is greater than or equal to a first threshold, the cutting position of the first electrode plate assembly to increase the width of the first electrode plates obtained after cutting, such that the tabs of the plurality of first electrode plates are aligned with each other; and/or advancing, if each of the plurality of consecutive tabs is subjected to leading and the number of tabs of the plurality of consecutive tabs is greater than or equal to a second threshold, the cutting position of the first electrode plate assembly to reduce the width of the first electrode plates obtained after cutting, such that the tabs of the plurality of first electrode plates are aligned with each other.

3. The method according to claim 2, wherein a distance by which the cutting position of the first electrode plate assembly is delayed is a first preset distance, which is less than or equal to five thousandths of a preset standard width of the first electrode plate; and/or a distance by which the cutting position of the first electrode plate assembly is advanced is a second preset distance, which is less than or equal to five thousandths of the preset standard width of the first electrode plate.

4. The method according to claim 2, wherein adjusting, if there are a plurality of consecutive tabs of the first electrode plate misaligned with each other, the cutting position of the first electrode plate assembly comprises:

stopping, if each of the plurality of consecutive tabs is subjected to lagging and the number of tabs of the plurality of consecutive tabs is greater than or equal to a third threshold, an operation of advancing the cutting position of the first electrode plate assembly, the third threshold being less than or equal to the first threshold; and/or stopping, if each of the plurality of consecutive tabs is subjected to leading and the number of tabs of the plurality of consecutive tabs is greater than or equal to a fourth threshold, the operation of delaying the cutting position of the first electrode plate assembly, the fourth threshold being less than or equal to the second threshold.

5. The method according to claim 2, wherein the first threshold is equal to the second threshold.

6. The method according to claim 1, wherein determining whether there are a plurality of consecutive tabs misaligned with each other in a first electrode plate assembly comprises:

determining, according to a difference between i-th position data of an i-th tab of the plurality of tabs in the first electrode plate assembly and preset position data, whether the i-th tab is subjected to lagging or leading, the i-th position data indicating a relative positional relationship between the i-th tab and a preset reference object, where i is a positive integer; and determining, if it is determined that each of the i-th tab to an (i+j)-th tab is subjected to lagging or leading, that there are the plurality of consecutive tabs misaligned with each other in the first electrode plate assembly, wherein the plurality of consecutive tabs are the i-th tab to the (i+j)-th tab, where j is a positive integer.

7. The method according to claim 6, wherein determining, according to a difference between i-th position data of an i-th tab of the plurality of tabs in the first electrode plate assembly and preset position data, whether the i-th tab is subjected to lagging or leading comprises:

determining, if the difference between the i-th position data and the preset position data is greater than or equal to a fifth threshold, that the i-th tab is subjected to lagging, the fifth threshold being greater than zero; and determining, if the difference between the i-th position data and the preset position data is less than or equal to a sixth threshold, that the i-th tab is subjected to leading, the sixth threshold being less than zero.

8. The method according to claim 6, further comprising: determining the i-th position data.

9. The method according to claim 8, wherein determining the i-th position data comprises:

determining a moment when the i-th tab is detected as a target moment; and determining that at the target moment, a positional relationship between the position of the i-th tab and the preset reference object is the i-th position data.

10. The method according to claim 1, wherein the first electrode plates are cathode electrode plates, and the second electrode plate is a continuous anode electrode plate.

11. The method according to claim 9, wherein an upper surface and a lower surface of the second electrode plate are alternately provided with a plurality of indentations, a second electrode plate area is between every two adjacent indentations of the plurality of indentations, and the second electrode plate is configured to be bent at the indentations, such that a plurality of the second electrode plate areas and the plurality of the first electrode plates are alternately stacked in the first direction, wherein the preset reference object for determining the i-th position data of the i-th tab in the first electrode plate assembly is:

the second electrode plate area corresponding to the first electrode plate where the i-th tab is located; or the indentation corresponding to the first electrode plate where the i-th tab is located.

12. A device for correcting positions of tabs of an electrode assembly, wherein the electrode assembly comprises a plurality of first electrode plates and a second electrode plate, an upper surface and a lower surface of the second electrode plate are alternately provided with a plurality of indentations, a second electrode plate area is between every two adjacent indentations of the plurality of indentations, the second electrode plate is configured to be bent at the indentations, such that a plurality of the second electrode plate areas and the plurality of the first electrode plates are alternately stacked in a first direction, the upper surface and the lower surface of the second electrode plate having are respectively covered with a first separator and a second separator, the plurality of first electrode plates are sequentially arranged on an upper surface of the first separator and a lower surface of the second separator according to the positions of the indentations of the second electrode plate, such that each of the plurality of the second electrode plate areas is correspondingly provided with one of the first electrode plates, the plurality of the second electrode plate areas and the plurality of first electrode plates are alternately stacked in the first direction, and the first separator and the second separator are configured to isolate each anode electrode plate area from the corresponding first electrode plate, and the device comprises: a processing unit and an electrode plate cutting unit, wherein, the processing unit is configured to:

determine whether there are a plurality of consecutive tabs misaligned with each other in a first electrode plate assembly, the first electrode plate assembly having a plurality of tabs; and adjust, if there are a plurality of consecutive tabs misaligned with each other, a position where the first electrode plate assembly is cut by the electrode plate cutting unit to adjust a width of at least one of the plurality of first electrode plates obtained after cutting the first electrode plate assembly, such that each one of the plurality of first electrode plates obtained after cutting the first electrode plate assembly according to the adjusted cutting position has one of the plurality of tabs, the tabs of the first electrode plates are aligned with each other, wherein the first electrode plates are anode electrode plates and the second electrode plate is a continuous cathode electrode plate, or the first electrode plates are cathode electrode plates and the second electrode plate is a continuous anode electrode plate.

13. A computer readable storage medium for storing a computer program, wherein the computer program causes a computer to implement the method of claim 1.

14. A stacking machine configured to manufacture an electrode assembly, the electrode assembly comprising a plurality of first electrode plates and a second electrode plate stacked alternately in a first direction, the stacking machine comprising:

the device for correcting positions of tabs of an electrode assembly of claim 12.

* * * * *